United States Patent [19]

Reynolds

[11] Patent Number: 5,069,735
[45] Date of Patent: Dec. 3, 1991

[54] APPARATUS FOR PRODUCING SEALED EDGE KNIT WIPING CLOTHS

[75] Inventor: James R. Reynolds, Spartanburg, S.C.

[73] Assignee: Milliken Research Corporation, Spartanburg, S.C.

[21] Appl. No.: 532,798

[22] Filed: Jun. 4, 1990

[51] Int. Cl.⁵ ............................................. D06C 25/00
[52] U.S. Cl. ..................... 156/497; 156/499; 156/510; 156/529; 156/88; 219/121.67; 26/DIG. 1; 66/170
[58] Field of Search ................ 156/88, 529, 497, 148, 156/515, 510, 499; 428/193; 83/936-938, 408, 47; 219/121.67, 121.66, 121.68; 26/DIG. 1; 66/170

[56] References Cited

U.S. PATENT DOCUMENTS

| | | | |
|---|---|---|---|
| 1,912,466 | 6/1933 | Remington | 26/DIG. 1 X |
| 1,912,724 | 6/1933 | Remington | 26/DIG. 1 X |
| 2,402,621 | 9/1944 | Gifford . | |
| 2,448,032 | 8/1948 | Kennedy . | |
| 2,460,566 | 2/1949 | Brown et al. . | |
| 2,578,889 | 12/1951 | Kennedy . | |
| 2,613,521 | 10/1952 | Walmsley . | |
| 2,747,250 | 5/1956 | Bramhall, Jr. et al. . | |
| 3,142,107 | 7/1964 | Wittig . | |
| 3,264,917 | 8/1966 | Califano et al. | 83/408 |
| 3,322,584 | 5/1967 | Welin-Berger | 156/88 X |
| 3,612,814 | 10/1971 | Houldcroft | 219/121.67 |
| 3,713,358 | 1/1973 | Honeycutt et al. | 83/47 X |
| 3,757,077 | 9/1973 | Siclari et al. | 219/121.67 |
| 3,784,183 | 1/1974 | Castro et al. | 219/121.67 X |
| 3,855,822 | 12/1974 | Lee . | |
| 3,874,043 | 4/1975 | Holm . | |
| 3,875,836 | 4/1975 | Hutchinson et al. | 83/47 X |
| 3,880,201 | 4/1975 | Lee, Jr. et al. . | |
| 4,029,535 | 6/1977 | Cannon et al. | 219/121.66 X |
| 4,452,113 | 6/1984 | Pearl | 83/938 X |
| 4,888,229 | 12/1989 | Paley et al. | 428/193 X |

FOREIGN PATENT DOCUMENTS

| | | | |
|---|---|---|---|
| 45-10771 | 4/1970 | Japan . | |
| 59-157373 | 9/1984 | Japan . | |
| 761656 | 11/1956 | United Kingdom . | |
| 1239406 | 7/1971 | United Kingdom | 83/936 |

Primary Examiner—Michael W. Ball
Assistant Examiner—Jeff H. Aftergut
Attorney, Agent, or Firm—Earle R. Marden; H. William Petry

[57] ABSTRACT

Apparatus and method to provide sealed edge products with a reduced tendency to lint and ravel by supplying a hot air jet in the range of 600°–800° F. to melt and swell the fibers to lock the warp yarns in the fabric. The hot air jet is directed perpendicular to the warp yarns and parallel to the fill yarns in the sealed edge product.

3 Claims, 2 Drawing Sheets

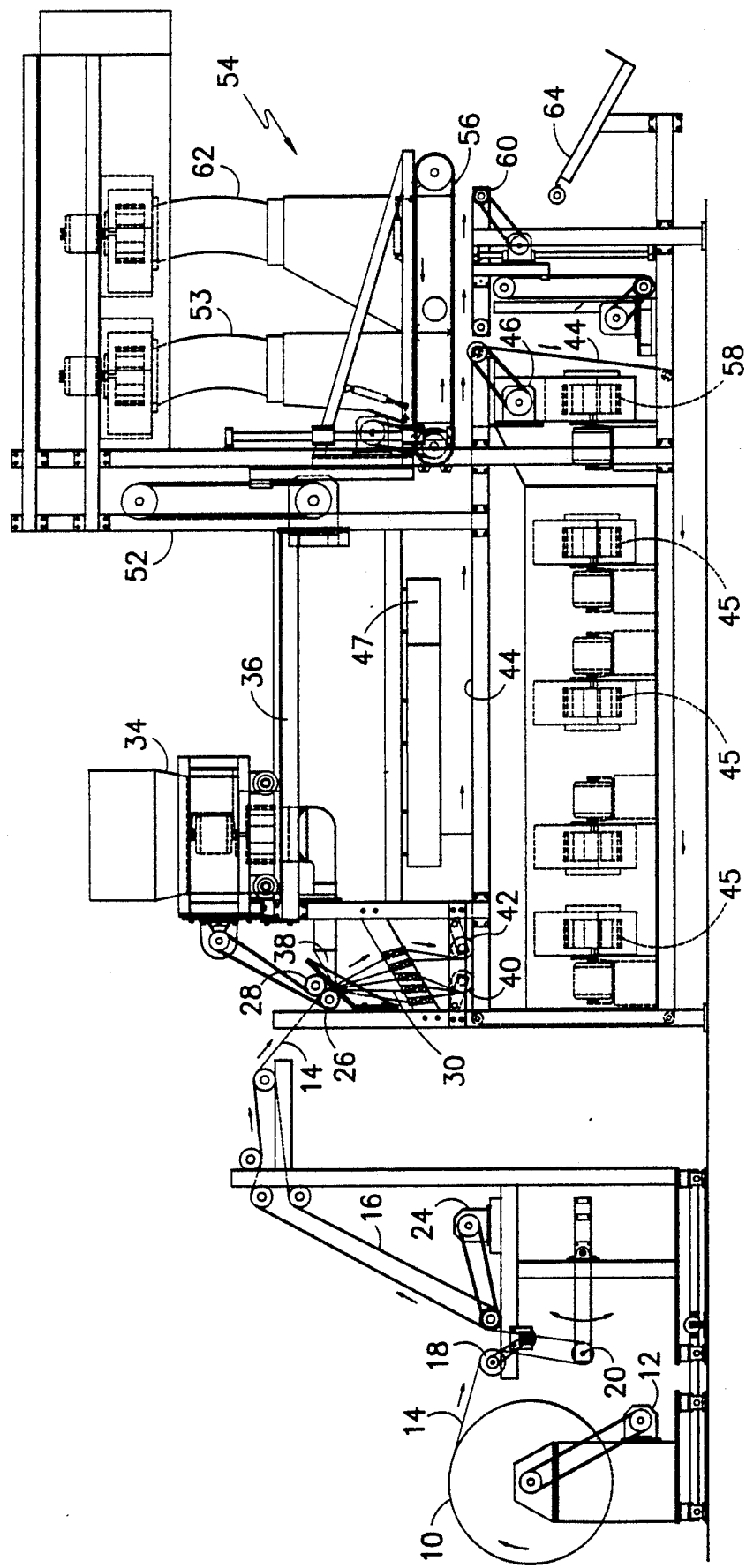
FIG. -1-

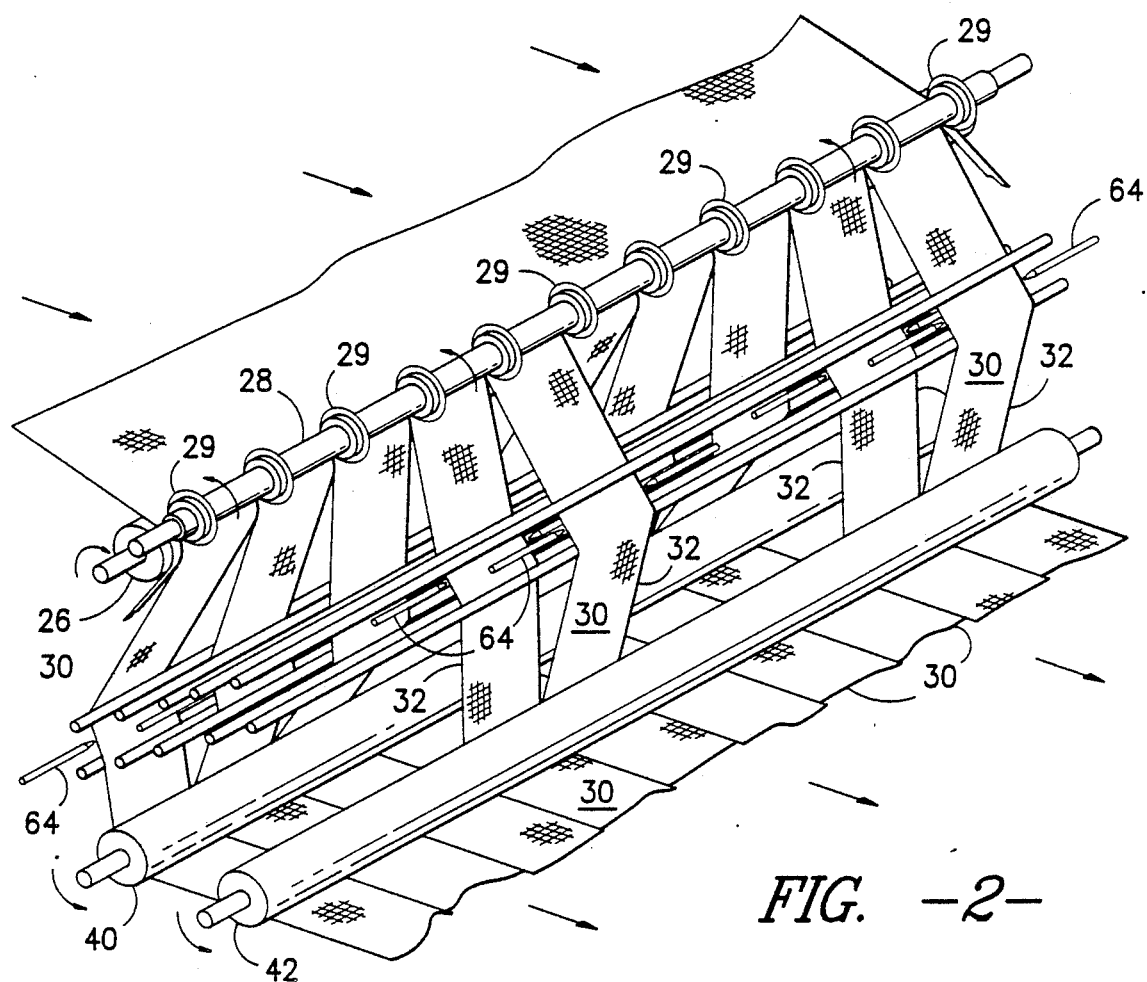
FIG. -2-
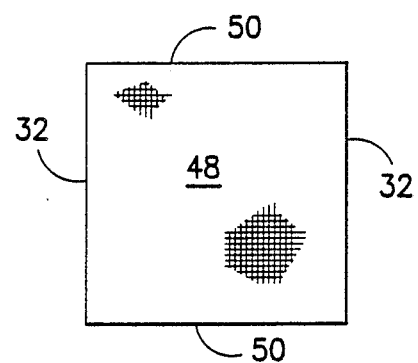
FIG. -3-

APPARATUS FOR PRODUCING SEALED EDGE KNIT WIPING CLOTHS

This invention relates generally to the production of sealed edge wiping cloths and in particular to sealed edge wiping cloths produced from long, wide rolls of knit or woven fabric employing synthetic or partially synthetic yarns which will melt to some degree when subjected to heat.

In the past wiping cloths were produced from knit or woven fabrics by cutting the fabrics into wiping cloth size and then over-edge hemming the borders of the fabric to prevent unravelling during use and/or washing thereof. The hemming of the cloths is labor intensive resulting in high production cost and the product produced tended to unravel after a few washings. Further, such towels could not be used in clean rooms due to the excessive linting problem.

Therefore, it is an object of the invention to produce individual edge sealed wiping cloths from large rolls of fabric which do not require extensive hand manipulation by operators and can be employed in clean room operations such as hospitals.

Other objects and advantages of the invention will become readily apparent as the specification proceeds to describe the invention with reference to the accompanying drawings, in which:

FIG. 1 is an overall schematic representation of the machine to produce sealed edge wiping cloths;

FIG. 2 is a perspective view of the slitting and edge sealing portion of the machine of FIG. 1, and FIG. 3 is a typical wiping cloth produced by the invention.

In the preferred form of the invention the fabric employed is a knit fabric, either jersey, Raschel or tricot, but could be woven or nonwoven so long as the fabric contains sufficient synthetic fibers that will melt and/or become tacky at temperatures between 600°-800° F. The preferred fabric is an interlock double knit having a weight of 4.0 oz/yd$^2$ using 70 denier, 34 filament polyester yarn.

Looking now to FIG. 1, a roll of fabric 10, preferably an interlock double knit, is driven by motor 12 at a speed to supply fabric 14 at a rate of 10-15 feet/minute to a conveyor 16 over an idler roll 18 and dancer roll 20. The conveyor 16 is driven by the motor 24 to maintain the desired speed of fabric feed of 10-15 feet/minute without causing the fabric to neck in at the selvages due to increased tension in the longitudinal direction of the fabric 14. From the conveyor 16, the fabric 14 is delivered between the driven roll 26 and the cutter roll 28 to be cut or slit longitudinally by the cutters 29 on the roll 28 into strips of fabric 30 as shown in FIG. 2. As shown in detail in FIG. 2 and hereinafter explained both of the cut selvages 32 of the strips 30 are heat sealed to prevent ravelling. To remove and accumulate lint and dust generated during the cutting operation a fan system 34 is mounted on the frame member 36 of the machine which has a suction nozzle 38 below the nip of the rolls 26 and 28.

After the fabric strips 30 have been formed and sealed they are guided by suitable rolls 40 and 42 onto the perforated endless conveyor 44 which is driven by motor 46. Mounted under the conveyor 44 are a plurality of fan members 45 to supply suction pressure through the conveyor 44 to hole the strips of fabric 30 in position thereon. Mounted above the conveyor 44 is a laser cutter 47 which travels diagonally to the path of travel to the strips of fabric 30 to longitudinally cut the strips 30 into individual towels 48 (FIG. 3) with sealed edges or selvages 32 and 50. The laser 47 cuts or is actuated in one direction only to cut across all the fabric strips and then is returned rapidly for another cut in the same direction.

Once the towels 48 are formed on the conveyor 44, the conveyor 44 transports them past the upright support member 52 into the stacking area 54. Immediately adjacent the member 52 is a plurality of fan systems 53. Preferably two, located above the conveyor 44 which apply a constant suction pressure on the conveyor 44 to pull towels 48 thereon upwardly against the towel transport conveyor 56 when the suction pressure of the fan 58 is directed to atmosphere by a suitable damper system. Then the towels 48 are transported over the reciprocally mounted table 60 by the conveyor 56 and the suction pressure exerted by the fan system 62. Then, through a suitable damper arrangement, the flow of air in the fan system 62 is reversed and the towels are blown down on the table 60 which is moved downward under the weight of the towels When the table 60 has moved downward to a certain level the towels 48 are transferred to the collection table or chute 64 for wrapping and removal.

As mentioned briefly before and shown in detail in FIG. 2 the knit fabric 14 is slit into strips of fabric 30 and then cut by the laser cutter 47 in the transverse direction to form the towels 48. Towels similar to towel 48 tended to ravel more due to the warp or wale yarns coming loose than raveling in the fill or course direction. To secure the warp yarns in position in the fabric strips a jet 64 of warm or hot air in the range of 600°-800° F. is directed toward each of the cut selvages perpendicular to the warp or wale direction and substantially parallel to the fill or course direction. To accomplish the desired effect the outlet of the air nozzle 64 is located approximately $\frac{1}{8}$" to $\frac{1}{4}$" away from the selvage and directs a flow of 10 SCFH ±2 SCFH (standard cubic feet per hour) through 0.065" outlet at a pressure of about 10 p.s.i. It has been found that the hot air from the jet causes the fibers to melt and swell to securely lock the warp or wale direction yarns in the fabric. Then the laser cutter 47 cuts the fabric strips 30 into towel size and seals the towels 48 in the fill or course direction to provide a towel product which is securely sealed on all of its edges The warp or wale direction of the fabric is the machine direction of travel of the fabric 14 and the fill or course direction is the cross machine direction of the fabric.

The herein-described method and apparatus automatically provides a sealed edge product which can be employed in operations such as clean rooms where lint from the product used can cause problems in operation It has been found that the herein-disclosed apparatus provides a product from which lint and ravelings therefrom are held to a minimum allowing the produced product to be used in clean rooms.

Although the preferred embodiment of the invention has been described it is contemplated changes may be made without departing from the scope or spirit of the invention and it is desired that the invention be limited only by the scope of the claims.

I claim:

1. Apparatus to provide a plurality of sealed edge products from a continuous wide width of fabric comprising: a roll of fabric rotably mounted in a roll stand, a cutter means having a plurality of cutters thereon spaced from another rotably mounted in said apparatus, means to supply fabric from the roll of fabric to said cutter means to cut the fabric into a plurality of strips of fabric, hot air supply means adjacent and outside the path of travel of the cut strips of fabric to heat and melt each of the selvages of the strips of fabric passing thereby, a conveyor means receiving the edge sealed strips of fabric from said cutter means, suction means operably associated with said conveyor means to hold the strips of fabric thereon, a laser cutter mounted above conveyor to cut the strips of fabric in the cross-machine direction, a collection table means adjacent said conveyor means and drive means to rotate said conveyor to deliver fabric cut by said laser cutter to said collection table means, said hot air supply means including a plurality of air jets with an air jet mounted outside and on each side of the path of travel of each of the cut strips of fabric, each of said jets being directed towards the path of travel of the cut strips and having its center axis parallel to the cross-machine direction of said apparatus.

2. The apparatus of claim 1 wherein said hot air jets are supplied air at a temperature of about 600°–800° F.

3. The apparatus of claim 2 wherein said collection table means includes a first means to stack cut sealed products and a second means to receive a stack of sealed edge products.

* * * * *